United States Patent [19]

Jadhav et al.

[11] Patent Number: 5,290,632
[45] Date of Patent: Mar. 1, 1994

[54] LIQUID COATINGS FOR CAST IRON

[75] Inventors: Jalandar Y. Jadhav, Ellicott City; Cung Vu, Columbia, both of Md.

[73] Assignee: W. R. Grace & Co.-Conn., New York, N.Y.

[21] Appl. No.: 877,319

[22] Filed: May 1, 1992

[51] Int. Cl.$^5$ .................... C08G 18/10; C08L 91/00; C08L 75/00; C08F 8/00
[52] U.S. Cl. ................. 428/423.1; 427/385.5; 427/388.1; 428/425.8; 524/590; 525/123; 525/130; 528/74.5; 528/60
[58] Field of Search ............... 524/590; 525/123, 130; 528/74.5, 60; 427/385.5, 388.1; 428/423.1, 425.8

[56] References Cited

U.S. PATENT DOCUMENTS

| | | | |
|---|---|---|---|
| 4,555,536 | 11/1985 | Maki et al. | 528/74.5 |
| 4,582,891 | 4/1986 | Maki et al. | 528/74.5 |
| 4,877,829 | 10/1989 | Vu et al. | 524/729 |
| 5,008,359 | 4/1991 | Hunter | 428/536 |

*Primary Examiner*—Paul R. Michl
*Assistant Examiner*—P. Niland
*Attorney, Agent, or Firm*—Valerie E. Looper

[57] ABSTRACT

Novel polyurethane formulations especially useful as coating for the protection of ductile cast iron pipes. The polyurethane is prepared by mixing two components, A and B. Component A comprises castor oil, a low molecular weight polyol having a molecular weight between 76 and about 450, preferably with an elastomer. Component B is a polymeric MDI.

30 Claims, No Drawings

LIQUID COATINGS FOR CAST IRON

FIELD OF THE INVENTION

The invention relates to protection of exterior surfaces, especially cast iron surfaces.

BRIEF SUMMARY OF THE INVENTION

A novel polyurethane resin is applied to exterior surfaces, especially cast iron surfaces subject to stress due to weather, temperature-induced dimensional changes, and the like. The inventive resin is especially useful as a coating for ductile cast iron pipes. The resin is applied as a mixture of two components, viz., (A) a polyol component and (B) a polymeric MDI (diisocyanate) component.

Component A consists essentially of (i) ricinoleic triglyceride (conveniently as castor oil) plus (ii) a low-molecular weight (76–450) polyol (e.g., glycerol) and (iii) optionally an elastomeric polyol. Component B is a low viscosity polymethylene polyphenyl isocyanate having an average molecular weight of about 340–380 and an average functionality of 2.6–2.7. Either Component A or B may include a polyurethane catalyst.

BACKGROUND OF THE INVENTION

Metal piping is an essential part of the infrastructure of every city. It is used in a wide variety of circumstances, from the most benign such as the interior of a home to the most extreme, such as acidic soil which freezes and thaws each year. Piping, of course, can be expensive and difficult to replace, particularly if it must be replaced after failure. Thus any method of improving the time in service of piping can result in significant savings to the pipeline user.

At present the pipeline industry is searching for higher performance coatings which can be effectively applied to prevent damage to pipes from corrosion and external mechanical stress. The presently prevalent commercial products are bituminous tape materials. These are essentially a layer of asphalt-like material with an adhesive backing. Although the existing bituminous tape materials are cheap, they have low impact resistance and their application is laborious and costly. Essentially, the tape has to be wound around the pipe. Certain pipeline industry manufacturers would like to phase out bituminous materials and replace them with thin, flexible, light, high performance coatings. In this invention we have developed a two-component polyurethane composition which can be effectively applied by spray and/or curtain coating onto metal pipes to obtain such a coating. This material is tough, has the right amount of flexibility and has excellent impact properties and with minimum cathodic disbonding.

An ideal high performance coating for metal pipe would have the following properties:

Ease of Handling—The material should be one that can be applied by both spray and curtain coating methods. Once applied, it should not come off easily or add significantly to the weight, size, or handling properties of the pipe. Also, the coating should not drip and should dry or cure quickly.

Durability—The material should adhere strongly to the metal substrate. In this case the inventors are particularly interested in coating ductile cast iron. Ductile cast iron is extremely hard, but is very vulnerable to corrosion, and coating will help, but corrosion will occur at any place where the coating is flawed. The coating should have high impact resistance, so that the coating does not chip off during transport and installation, and also maintain some degree of flexibility as reflected in its tensile strength, tear strength, and elongation. These traits accommodate the pipe's inevitable response to temperature changes and long-term mechanical stress.

Water Resistance—One of the major functions of the coating is to keep water away from the metal surface. The coating itself must be highly resistant to liquid water over time. Also, it is desirable that the coating be largely impenetrable to water vapor, i.e., have a low vapor transmission rate. Resistance to liquid water and resistance to water vapor do not necessarily go hand in hand. In the case of coatings for oxidizable metals, it is particularly important to keep water vapor away from the metal, as small pockets of rust can form, which will force the coating to "bubble up" and the pipe to corrode. Finally, the coating must exhibit a minimum of cathodic disbonding, i.e., delamination of the coating at the site of a coating defect.

Environmentally Benign—Another significant advantage would be if the formulation is solventless, i.e., does not use any of the volatile organic compounds which will eventually be banned due to environmental concerns.

The inventors have found that a variation of the type of coatings previously applied to concrete is especially useful because it encompasses all the listed advantages. Such concrete coatings are disclosed in U.S. Pat. No. 4,877,829, issued to Vu et al. Oct. 31, 1990, the text of which is incorporated herein by reference as if set forth in full.

DESCRIPTION OF CERTAIN COMPONENTS

Castor oil is a well-known commercial product. It contains (depending on source) about 85–90% ricinoleic triglyceride, with small amounts of the glycerides of other fatty acids, e.g., oleic and linoleic. Solvent-extracted castor oil may contain small amounts of solvent, e.g., 1% toluene.

The polymeric MDI is a low viscosity polymethylene polyphenyl-isocyanate having an average molecular weight of about 340–380, an isocyanate equivalent of about 133, and NCO content by weight of about 31.6, an average functionality of about 2.6–2.7.

Hycar 1300×17 is a long chain acrylonitrile-butadiene hydroxyl-terminated diol (copolymer with 17% acrylonitrile) available from BF Goodrich Co., Cleveland, Ohio. Weight average molecular weight is about 4,000, viscosity, 140,000 cps; hydroxyl number, 25 mg KOH/g; residual carboxyl acid number, 3.9.

Poly bd ® 45HT is a liquid dihydroxy-terminated polybutadiene, molecular weight about 2,800, available from Atochem Chemical Co.

DETAILED DESCRIPTION OF THE INVENTION

Our polyurethane resin is formed basically of two components; identified for the sake of brevity as (A) and (B). (A) comprises polyols. (B) is the polyisocyanate.

(A) consists essentially of (i) castor oil plus a low molecular weight polyol with at least two, preferably three hydroxyl groups and a molecular weight between about 76 and about 450 and, optionally, (ii) an elastomer preferably but not necessarily with functional groups such as hydroxyl, amino, active hydrogen, etc., capable of reacting with polyisocyanate, suitably an elastomeric diol.

Representative of suitable low molecular weight polyols (with molecular weights) are:
Glycerol (92) preferred
Butanetriol-1,2,3 (106)
Trimethylolethane (120)
Pentaglycerol (120)
Erythritol (122)
Trimethylolpropane (134)
Pentaerythritol (136)
Triethanolamine (149)
Triethanolpropane (176)
1,4-Butane diol (90)
1,2-Propylene glycol (76)
1,3-Propylene glycol (76)
Dipropylene glycol (134)
Tripropylene glycol (192)
N,N-Dihydroxypropyl aniline (209)
2-Ethyl-1-hexane diol (118)
Propylene oxide extended trimethylolpropane (450)
Propylene and ethylene oxide extended trimethylolpropane (267)

The elastomer can be a material of the group: natural rubber, epoxidized natural rubber, ethylene-propylene rubber, nitrile rubber, styrene-butadiene rubber, acrylic elastomers, butyl rubber, chlorosulfonated polyethylene, neoprene, polybutadiene, polyisoprene, and the like. We prefer polybutadiene (such as Poly bd ® 45HT, as above described) or an acrylonitrile-butadiene copolymer (such as Hycar 1300×17, as above described).

The elastomer functions in at least two ways. In the first place, it provides flexibility to the polyurethane membrane. This flexibility is of a type that permits the membrane to flex with the metal surface's response to slow mechanized stress and the continual daily change in temperature, month after month, without cracking. This flexibility is maintained even at sub-zero temperatures.

Component B is a polymeric MDI having an average molecular weight of about 340-380, and an average functionality of about 2.6-2.7. Polymeric polyisocyanates of this type are available as PAPI ® 2027 from Dow Chemicals, Midland, Mich.

Catalyst/No Catalyst

Our formulations can be used with or without a catalyst, depending on the method of the application. If the formulation is sprayed or otherwise applied in such manner that the two components are admixed at the point of application, a catalyst may be desirable to ensure quick curing. That is, the coating should be dry to the touch within minutes. On the other hand, where the components are mixed in a container, and the container is required to supply the complete polyurethane formulation over a period of time (say, 30 minutes or more), then a catalyst is inadvisable. In some cases an inhibitor may actually be necessary to extend the pot life. A number of polyurethane inhibitors are known, including: organic and inorganic acids, such as benzoyl chloride, p-toluene sulfonic acid, formic acid, acetic acid, benzoic acid, phosphoric acid, hydrochloric acid, and the like.

When an inhibitor is used, it is suitable about 0.01-1.0 weight % of the overall polyurethane mix.

A catalyst is recommended for spraying operations or where the formulation is to be applied to concrete immediately on mixing. For this purpose, substantially any of the conventional polyurethane catalysts (and combinations) can be used.

These catalysts include:

Tertiary Amines

Triethylene diamine
N-methyl morpholine
N-ethyl morpholine
Diethyl ethanolamine
1-methyl-4-dimethylamino ethyl piperazine
3-methoxy-N-dimethyl propyl amine
N-dimethyl-n'-methyl isopropyl propylene diamine
N,N-diethyl-3-diethyl amino propylamine
N,N-dimethyl benzyl amine
Dicyclohexylmethylamine
2,4,6-tris dimethylaminomethylphenol
N,N-dimethyl cyclohexylamine
Triethylamine
Tri-n-butylamine
1,8-diaza-bichloro[5,4,0]-undecene-7
N-methyl diethanolamine
N,N-dimethyl ethanolamine
N,N-dimethyl cyclohexylamine
N,N,N'N'-tetramethyl-ethylene diamine
1,4-diaza-bicyclo-[2,2,2]-octane
N-methyl-N'-dimethylaminoethyl-piperazine
Bis-(N,N-diethylaminoethyl)-adipate
N,N-diethylbenzylamine
Pentamethyldiethylene triamine
N,N,N'-tetramethyl-1,3 butanediamine
1,2-dimethylimidazole
2-methylimidazole Tin Compounds Stannous chloride
Dibutyl tin di-2-ethyl hexoate
Stannous octoate
Dibutyl tin dilaurate
Trimethyl tin Hydroxide
Dimethyl tin dichloride
Dibutyl tin diacetate
Dibutyl tin oxide
Tributyl tin acetate
Tetramethyl tin
Dimethyl dioctyl tin
Tin ethyl hexoate
Tin laurate
Dibutyl tin maleate
Dioctyl tin diacetate Other Metal Organics Zinc octoate
Phenyl mercuric propionate
Lead octoate
Lead naphthenate
Copper naphthenate As to the amount of catalyst(s), the preferred amount of tertiary amine, as well as tin or other metal-containing catalyst is about 0.001-0.5%, based on the total weight of polyols plus polyisocyanate. Mixtures of tertiary amines and organo-metallics are particularly suitable as catalysts for this invention.

Fillers in the above formulations (e.g., molecular sieves and fumed silica) assist in viscosity control of the liquid polyurethane, aid in levelling the coating, and act as moisture absorbers. (See, e.g, U.S. Pat. No. 4,567,230 re molecular sieve moisture absorbers.) The moisture comes not from the resin, but rather from the underlying surface and from the atmosphere. The demoisturizing fillers can, however, be omitted, with acceptable results.

In the general case, and especially in humid conditions, molecular sieves should be added to the formulation when it is to be sprayed. The spray droplets tend to absorb atmospheric moisture, and this moisture reacts with the polyisocyanate to release carbon dioxide, which causes foaming in the membrane with consequent severe deterioration of properties in the cured membrane. Molecular sieves inhibit this foaming by absorbing moisture before it can react with the polyisocyanate component. When molecular sieves (or equivalent moisture absorber) are used, a suspending (thixotropic) agent is preferably used to maintain the molecular sieves in suspension. These materials are well known and are available commercially.

Besides molecular sieves and thixotropic agents, we can also add antioxidants, reinforcing agents, plasticizers, UV stabilizers, pigments, fillers, and corrosion inhibitors, in amounts ranging from about 0.01 to 25% by weight of the total composition.

Percentages are by weight unless otherwise stated. Suitable ratios for certain components are:

TABLE I

|  | Workable Ranges Parts by Wt. | Preferred Ranges Parts by Wt. |
| --- | --- | --- |
| Component A |  |  |
| Castor oil | about 90 to 140 | about 100 to 130 |
| Low MW Polyol | about 8 to 100 | about 12 to 90 |
| Elastomeric polyol | about 0 to 60 | about 20 to 50 |
| Molecular sieves | 0 to 10 | about 6 to 9 |
| Component B Polymeric MDI | about 40 to 120 | about 50 to 110 |

Generic and preferred embodiments of the invention include:

(1) the novel combination of Components A and B as set forth in generic and specific formulations herein:

(2) the processes (generic and specific) of mixing together Components A and B aforesaid;

(3) the resins (generic and specific) resulting from (2) above;

(4) process of coating a substrate with the resins of (3) above. Substrates of particular interest are metals, particularly ductile cast iron.

(5) coated metal articles resulting from (4) above;

(6) overall process of protecting ductile cast iron by applying the resins of (3) above to metal or concrete, as the case may be;

(7) as an article, ductile cast iron pipe comprising metal-polyurethane laminate, the polyurethane being the resin of (3) above.

Mixing and Application

For small batches, such as might be needed for minor repair work, the two Components A and B can be mixed in an open container at room temperature, and the mixture can then be spread on the metal surface. To extend pot life, it may be desirable to eliminate the catalyst, or even to use an inhibitor. For general large scale work (and the resin is designed for this) a conventional two-liquid air spray gun is recommended for best results.

Application to the pipe surface is suitably made at ambient temperature, preferably above freezing. The coated substrate is rapidly tack-free and cures at ambient temperature.

It is preferred that the resin be applied to a dry surface. However, some dampness can be tolerated.

EXAMPLE 1

This represents a preferred embodiment of the invention. A polyurethane coating was prepared from two components, A and B, in parts by weight given as about:

|  |  | Parts by Weight |
| --- | --- | --- |
| Component A (Polyol): | Castor oil | 100.00 |
|  | Glycerol | 12.5 |
|  | Polybutadiene[1] | 44.1 |
|  | Baylith L Paste | 7.4 |
|  | Calcium Carbonate | 19.2 |
|  | Aerosil R 202[2] | 1.0 |
|  | Titanium Dioxide | 2.0 |
|  | Ethacure 100 | 2.0 |
|  | 33 LV Catalyst | 0.25 |
|  | Dibutyl Tin Dilaurate | 0.09 |
|  | Reactint (R) blue X17 | 0.5 |
| Component B | Polymeric MDI (PAPI 2027) | 101.5 |

[1]Poly bd ®, above described.
[2]Thixotropic aid, available from Degussa.

(a) Baylith L Paste is a 50:50 dispersion of synthetic zeolite (molecular sieves) and castor oil and it functions as a moisture scavenger for the polyol. It is commercially available from Miles Incorporated (previously Mobay).

(b) Aerosil R 202 is a hydrophobic fumed silica which acts a dispersing aid for heavy fillers such as calcium carbonate and also acts as a thixotrope. It is commercially available from Degussa Corporation.

The ingredients listed under Component A were mixed using a high shear mixer and then degassed under vacuum to form Component A, which was then mixed with Component B. Reaction occurred instantaneously. The resulting polyurethane can be sprayed or curtain coated onto metal or other substrates. The coating cures within minutes. Preliminary tests show that the coating is very hard, stands up to 200° C. for at least 1 hour, and adheres extremely well to ductile cast iron. It has a particular advantage in that it is hydrophobic and resists reaction with moisture, thereby greatly diminishing formation of microfoam in the coating when spray is applied at high humidity.

EXAMPLE 2

Four sample panels of the formulation of Example 1 were prepared by hard casting a film 1.75 mm thick onto grit blasted 100 mm × 150 mm × 5 mm ductile iron panels. The samples were individually tested according to the following methods:

ASTM G14 Falling Weight Impact Strength, 90° Impact Angle

This standard uses a falling Weight to measure the coating resistance to chipping or breaking on impact with a solid object. The best available material on the market is said to have an impact resistance of 15 Joules.

RDM-0004 Cathodic Disbondment (Equivalent to B.Gas PS/CW5)

Cathodic disbondment tests were run for 7 days and 28 days according to the test method RDM-0004. A hole was drilled in the coating of a ductile iron coupon to simulate a defect in the coating. The coupon was placed in salt water and current was introduced through the metal. After 7 days and 28 days, disbondment of the coating around the hole was measured in mm.

Coated Panel 70° C. Water Resistance

This test was devised especially to examine the resistance of the coating to a head of water at elevated temperature. Although the temperature used was well above the service temperature for ductile iron water pipes, this test provides accelerated comparisons between different materials. It is also possible that these materials may be used as coatings for pipes operating at elevated temperatures in the future.

The test method consisted of adhering 150 mm long by 50 mm interior diameter rigid PVC pipe to the coating surface with a polyurethane sealant, filling the test pot with salt water and sealing with a lid. Two test cells were fitted to each sample, one cell having a 6 mm diameter cathodic disbondment test type holiday (hole cut in the coating) through the coating and one without.

The test samples were then heated in an oven for 28 days. After this period the test pots were removed and the coatings visually examined for faults. The test area was then cut and examined for adhesion, appearance of the coating and of the substrates.

Modified RDM-0049 Butt-pull Adhesion (25 mm×25 mm Sample)

This test measures the force required to pull a unit area coating from a surface. Results are reported as N/mm$^2$, and the failure mode should be cohesive.

Test results are summarized as follows:
Impact Strength: 18.07 Joules
7-Day Disbondment Radius 1 mm
28-Day Disbondment Radius 1.5 mm
Butt-Pull Adhesion
Pull-Off Strength 10.87 N/mm$^2$
Failure Mode Cohesive
Hot Water Resistance
Holiday: There were many tiny pimples on the coating surface due to mater migration into air bubbles in the film. When cut open there was no evidence of rusting or undercutting. Adhesion was excellent, it being impossible to remove the coating without chiselling with a screwdriver. There was no darkening of the iron surface.
No Holiday: As for holiday above.

This formulation shows almost no cathodic disbondment and has an impact resistance above 15 Joules. It has excellent adhesion and flexibility. This coating tends to retard the spread of corrosion from a coating flaw into nearby areas.

EXAMPLE 3

This represents a preferred embodiment of the prior art concrete coating formulation. A polyurethane coating was prepared from two components, A and B, in parts by weight given as about:

| | Parts by Weight |
|---|---|
| Component A | |
| Castor oil | 100 |
| Glycerine | 6.2 |
| Polybutadiene$^{(1)}$ | 25 |
| Molecular sieves in castor oil, 1:1 | 40 |
| CaCO$_3$ | 40 |

-continued

| | Parts by Weight |
|---|---|
| Cr$_2$O$_3$ | 3.2 |
| Fumed silica$^{(2)}$ | 1.8 |
| Dibutyl tin dilaurate | 0.47 |
| Component B | 107.8 |
| Modified MDI (Mondur XP-744) | |

$^{(1)}$Poly bd ®, above described.
$^{(2)}$Thixotropic aid, available as Aerosil R-202, Degussa.

Following the procedure of Example 1, the ingredients listed under Component A were mixed to form Component A, which was then mixed with Component B. Reaction occurred instantaneously. The resulting polyurethane can be sprayed or curtain coated onto metal or other substrates. The coating cures within minutes. Preliminary tests show that the coating is very hard, stands up to 200° C. for at least 1 hour, and adheres well to ductile iron. It has a particular advantage in that it is hydrophobic and resists reaction with moisture, thereby greatly diminishing formation of microfoam in the coating when the spray is applied at high humidity.

The impact resistance was only 5.18 Joules, well below 15 Joules. The cathodic disbondment test showed a disbondment radius of 26 mm at 7 days, and was discontinued for that reason. Further testing was not done on this material due to its failure in two critical screening tests.

We claim:

1. Composition consisting essentially of two separate components, A and B;
   Component A consisting essentially of, in parts by weight, (i) about 100–130 parts of castor oil; (ii) a low molecular weight polyol having at least 2 hydroxyl groups and a molecular weight between 76 and about 450, 12–90 parts; and (ii) an elastomer, about 20–50 parts;
   Component B, about 50–110 parts; being a polymeric polyisocyanate having an average molecular weight of about 340–380 and a functionality of about 2.6–2.7.

2. Composition according to claim 1 wherein Component B is a polymethylene polyphenyl isocyanate.

3. Composition according to claim 1, wherein the elastomer is polybutadiene or an acrylonitrile-butadiene copolymer.

4. The composition of claim 1 wherein Component A contains in addition at least one additive selected from the group consisting of polyurethane catalyst, polyurethane inhibitor, molecular sieves, thixotropic agents, anti-oxidants, reinforcing agents, plasticizers, UV stabilizers, pigments, fillers, and corrosion inhibitors.

5. The composition according to claim 4 in which the additive is molecular sieves.

6. Composition according to claim 1 wherein in parts by weight,

| Component A (Polyol): | |
|---|---|
| Castor oil | 100.00 |
| Glycerol | 12.5 |
| Polybutadiene | 44.1 |
| [Baylith L Paste 7.4] | |
| 50:50 synthetic zeolite:castor oil | 7.4 |
| Calcium Carbonate | 19.2 |
| [Aerosil R 202 1.0] | |
| Fumed Silica | 1.0 |
| Titanium Dioxide | 2.0 |
| [Ethancure 100 2.0] | |

-continued

| | |
|---|---|
| Diethyltoluenediamine | 2.0 |
| [33 LV Catalyst 0.25] | |
| 1:2 triethylenediamine:dipropylene glycol | 0.25 |
| Dibutyl Tin Dilaurate | 0.09 |
| [Reactint (R) blue X17 0.5] | |
| Reactive polymeric colorant | 0.5 |
| Component B | 101.5 |
| Polymeric MDI (PAPI 2027) | |

7. A polyurethane resin, said resin being the product obtained by reacting together Component A and Component B as defined in claim 1.

8. Polyurethane resin according to claim 7 wherein Component B is polymethylene polyphenyl isocyanate.

9. Polyurethane resin according to claim 8 wherein in parts by weight,

| | |
|---|---|
| Component A (Polyol): | |
| Castor oil | 100.00 |
| Glycerol | 12.5 |
| Polybutadiene | 44.1 |
| [Baylith L Paste 7.4] | |
| 50:50 synthetic zeolite:castor oil | 7.4 |
| Calcium Carbonate | 19.2 |
| [Aerosil R 202 1.0] | |
| Fumed Silica | 1.0 |
| Titanium Dioxide | 2.0 |
| [Ethacure 100 2.0] | |
| Diethyltoluenediamine | 2.0 |
| [33 LV Catalyst 0.25] | |
| 1:2 triethylenediamine:dipropylene glycol | 0.25 |
| Dibutyl Tin Dilaurate | 0.09 |
| [Reactint (R) blue X17 0.5] | |
| Reactive polymeric colorant | 0.5 |
| Component B | 101.5 |
| Polymethylene Polyphenyl | |
| Isocyanate (PAPI 2027) | |

10. Process of forming a polyurethane resin comprising intimately mixing together two components, A and B, as defined in claim 1.

11. Process according to claim 10 wherein Component B is polymethylene polyphenyl isocyanate.

12. Process according to claim 11 wherein, in parts by weight,

| | |
|---|---|
| Component A (Polyol): | |
| Castor oil | 100.00 |
| Glycerol | 12.5 |
| Polybutadiene | 44.1 |
| [Baylith L Paste 7.4] | |
| 50:50 sythetic zeolite:castor oil | 7.4 |
| Calcium Carbonate | 19.2 |
| [Aerosil R 202 1.0] | |
| Fumed Silica | 1.0 |
| Titanium Dioxide | 2.0 |
| [Ethacure 100 2.0] | |
| Diethyltoluenediamine | 2.0 |
| [33 LV Catalyst 0.25] | |
| 1:2 triethylenediamine:dipropylene glycol | 0.25 |
| Dibutyl Tin Dilaurate | 0.09 |
| [Reactint (R) blue X17 0.5] | |
| Reactive polymeric colorant | 0.5 |
| Component B | 101.5. |
| Polymeric MDI (PAPI 2027) | |

13. Process of coating a substrate comprising applying thereto a resin, the resin being obtained by reacting Component A with Component B, wherein
   Component A consisting essentially of, in parts by weight, (i) about 100–130 parts of castor oil;
   (ii) a low molecular weight polyol having at least 2 hydroxyl groups and a molecular weight between 76 and 450, 12–90 parts; and (iii) an elastomer, about 20–50 parts;
   Component B, about 50–110 parts; being a polymeric polyisocyanate having an average molecular weight of about 340–380 and a functionality of about 2.6–2.7.

14. Process of coating a substrate comprising applying thereto a resin, the resin being obtained by reacting Component A with Component B, wherein the resin is that of claim 8.

15. Process of coating a substrate comprising applying thereto a resin, the resin being obtained by reacting Component A with Component B, wherein the resin is that of claim 9.

16. Process according to claim 13, 14 or 15 wherein the substrate is metal.

17. Process according to claim 13, 14 or 15 wherein the substrate is cast iron.

18. Process according to claim 17 wherein the substrate is ductile cast iron.

19. Article comprising a substrate and a film coating adhered thereon, said film coating comprising the resin of claim 7.

20. Article comprising a substrate and a film coating adhered thereon, wherein the film coating comprises the resin of claim 8.

21. Article comprising a substrate and a film coated adhered thereon, wherein the film coating comprises the resin of claim 9.

22. Article according to claim 19, 20 or 21 wherein the substrate is metal.

23. Article according to claim 19, 20 or 21 wherein the substrate is cast iron.

24. Article according to claim 23 wherein the substrate is ductile cast iron.

25. Process of aiding in the protection of a metal surface from damage due to transportation, installation, weathering, and associated injury-sources, wherein a polyurethane coating is applied to the surface; characterized in that the polyurethane is the resin defined in claim 7.

26. Process of aiding in the protection of a metal surface from damage due to transportation, installation, weathering, and associated injury-sources, wherein a polyurethane coating is applied to the surface in which the polyurethane is the resin of claim 8.

27. Process of aiding in the protection of a metal surface from damage due to transportation, installation, weathering, and associated injury-sources, wherein a polyurethane coating is applied to the surface in which the polyurethane is the resin of claim 9.

28. Article comprising a metal surface having a layer of polyurethane resin of claim 7 applied thereon.

29. Article comprising a metal surface having a layer of polyurethane resin; wherein the resin is the resin of claim 8.

30. Article comprising a metal surface having a layer of polyurethane resin; wherein the resin is the resin of claim 9.

* * * * *

UNITED STATES PATENT AND TRADEMARK OFFICE
CERTIFICATE OF CORRECTION

PATENT NO. : 5,290,632  Page 1 of 3
DATED : March 1, 1994
INVENTOR(S) : Jalandar Y. Jadhav; Cung Vu It is certified that error appears in the above-indentified patent and that said Letters Patent is hereby corrected as shown below:

In Claim 6, col. 8, please delete the following words and brackets:

"[Baylith L Paste 7.4]"

"[Aerosil R 202 1.0]"

"[Etha cure 100 2.0]"

In Claim 6, col. 9, please delete the following words and brackets:

"[33LV Catalyst 0.25]"

"[Reactint (R) blue X17 0.5]"

In Claim 9, col. 9, please delete the following words and brackets:

"[Baylith L Paste 7.4]"

"[Aerosil R 202 1.0]"

"[Ethacure 100 2.0]"

"[33LV Catalyst 0.25]"

"[Reactint (R) blue X17 0.5]"

In Claim 12, col. 9, please delete the following words and brackets:

"[Baylith L Paste 7.4]"

"[Aerosil R 202 1.0]"

"[Ethacure 100 2.0]"

"[33 LV Catalyst 0.25]"

"[Reactint (R) blue X17 0.5]"

UNITED STATES PATENT AND TRADEMARK OFFICE
CERTIFICATE OF CORRECTION

PATENT NO. : 5,290,632
DATED : March 1, 1994
INVENTOR(S) : Jalandar Y. Jadhav; Cung Vu It is certified that error appears in the above-indentified patent and that said Letters Patent is hereby corrected as shown below:

Column 6, line 25, please add:

— The description and function of commercially available components used in the composition are given below: —

Column 6, line 36, please add:

— (c) Titanium dioxide is powered material which acts as a whitening agent to obtain desired pigment shade to the coating. It is available commercially from DuPont.

(d) Ethacure 100 is diethyltoluenediamine (DETDA) which acts as a curing agent and chemical thixotrope in urethane coating when employed in low level (<5%). It is commercially available from Ethyl Corporation.

(e) Catalyst 33-LV is a mixture of 33% of triethylenediamine and 67% of dipropylene glycol and acts as a urethane catalyst. It is commercially available from Air Products.

UNITED STATES PATENT AND TRADEMARK OFFICE
CERTIFICATE OF CORRECTION

PATENT NO. : 5,290,632

DATED : March 1, 1994

INVENTOR(S) : Jalandar Y. Jadhav et al

It is certified that error appears in the above-indentified patent and that said Letters Patent is hereby corrected as shown below:

(f) Reactint (R) blue X17 is a reactive polymeric colorant for urethanes. It is commercially available from Milliken Chemicals.

Signed and Sealed this

Nineteenth Day of July, 1994

Attest:

BRUCE LEHMAN

Attesting Officer  Commissioner of Patents and Trademarks